United States Patent [19]

Akutagawa et al.

[11] Patent Number: 4,768,039

[45] Date of Patent: Aug. 30, 1988

[54] HEAT TRANSFER RECORDING WITH AUTOMATIC RIBBON TAKE-UP POSITIONING/DRIVING MEANS

[75] Inventors: Hiroshi Akutagawa; Koji Takeuchi, both of Toyokawa, Japan

[73] Assignee: Minolta Camera Kabushiki Kaisha, Osaka, Japan

[21] Appl. No.: 55,155

[22] Filed: May 28, 1987

[30] Foreign Application Priority Data

May 30, 1986 [JP] Japan .............................. 61-126987

[51] Int. Cl.[4] .............................. G01D 15/10

[52] U.S. Cl. .............................. 346/76 PH; 400/120; 400/208; 400/236

[58] Field of Search .............................. 346/1.1, 76 R, 76 PH; 219/216, 216 PH; 400/120 PH, 120, 191, 192, 207, 208, 208.1, 224.2, 236, 240.3

[56] References Cited

U.S. PATENT DOCUMENTS 4,408,732 10/1983 Toriumi et al. .

FOREIGN PATENT DOCUMENTS 0204585 11/1984 Japan .............................. 400/120

*Primary Examiner*—E. A. Goldberg
*Assistant Examiner*—Huan H. Tran
*Attorney, Agent, or Firm*—Burns, Doane, Swecker & Mathis

[57] ABSTRACT

An apparatus for use with a cassette having accommodated therein an ink material, a feed roller and a take-up roller for the material. A pair of driving heads in the cassette loading portion of the apparatus are automatically connectable to or disconnectable from the opposite ends of the take-up roll by spring levers which are movable in response to the loading or unloading of the cassette. When connected to the take-up roll, the heads center the take-up roll and position the roll in place axially thereof. The feed roll is positioned in place by V-shaped bearings in the loading portion. Thus, the two rolls can be positioned accurately automatically without necessitating any special procedure.

9 Claims, 7 Drawing Sheets

HEAT TRANSFER RECORDING WITH AUTOMATIC RIBBON TAKE-UP POSITIONING/DRIVING MEANS

BACKGROUND OF THE INVENTION

The present invention relates to a heat transfer recording apparatus, and more particularly to a heat transfer recording apparatus which is adapted for use with a cassette accommodating an ink material between a feed roll and a take-up roll and in which the ink material and a recording sheet overlapped thereto are passed between a platen and a thermal head pressed thereagainst for thermally transferring ink images to the recording sheet.

Unexamined Japanese Patent Publication SHO No. 60-27580 discloses a heat transfer recording apparatus of the type mentioned for use with a synthetic resin cassette containing an ink material. The disclosed apparatus is so adapted that a material take-up mechanism for driving the take-up roll is manually disconnected from the take-up roll before the cassette is removed from the apparatus.

The ink material can be set in the apparatus and removed therefrom easily by the use of the cassette, while the cassette, which is made of synthetic resin, is lightweight and inexpensive. However, the cassette of the conventional apparatus is still inconvenient to load into or unload from the apparatus since the take-up mechanism must then be connected to or disconnected from the take-up roll manually.

SUMMARY OF THE INVENTION

The main object of the present invention is to provide a heat transfer recording apparatus which is convenient to use with a cassette having an ink material and a take-up roll accommodated therein and which comprises take-up means automatically connectable to the take-up roll to render the material ready for use merely by loading the cassette in position for use, the take-up means being automatically returnable to a position disconnected from the take-up roll when the cassette is unloaded from the apparatus so as to render the cassette unloadable without necessitating any other special manipulation.

Another object of the present invention is to provide a convenient heat transfer recording apparatus of the type described wherein the take-up means is automatically engageable with or disengageable from the take-up roll by simple mechanical coupling means upon loading or unloading the cassette to render the apparatus inexpensive and reliably operable.

Another object of the present invention is to provide a convenient heat transfer recording apparatus of the type described which has a bearing portion for supporting a feed roll thereon as positioned in place axially thereof and as properly centered and in which the take-up roll is positionable in place axially thereof as properly centered by the connection of the take-up means to the take-up roll, the feed and take-up rolls thus being properly positionable with high accuracy merely by loading the cassette into the apparatus even if the rolls are not held in position accurately within the cassette.

Other objects and features of the present invention will become apparent from the following description and the accompanying drawings.

DETAILED DESCRIPTION OF THE INVENTION

Figure 1:
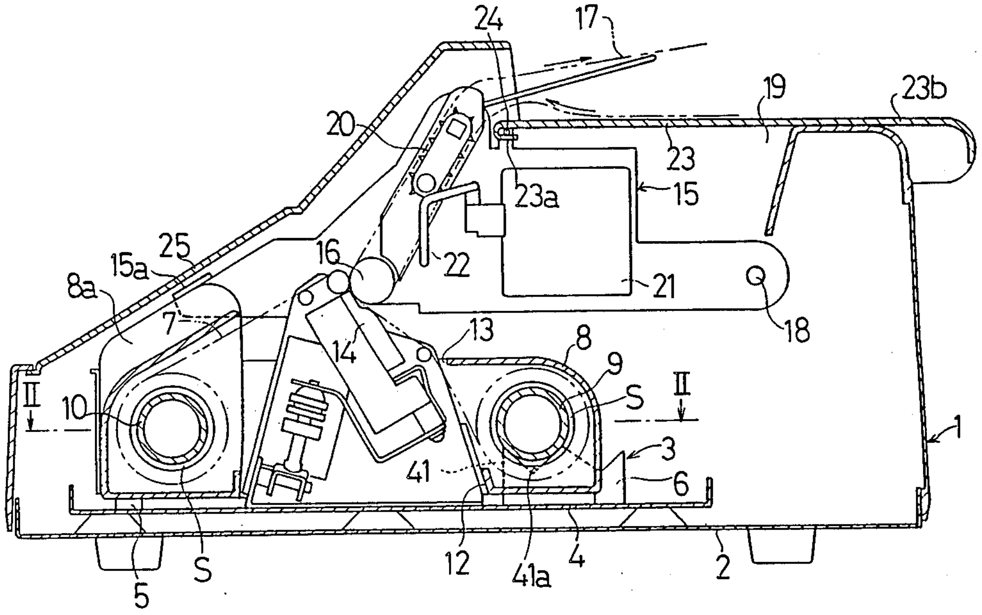
FIG. 1 is an overall sectional view showing a heat transfer recording apparatus as a first embodiment of the invention.

Throughout the drawings, like parts are designated by like reference numerals.

FIGS. 1 to 6 show a first embodiment of the invention comprising take-up means which is automatically connectable to or disconnectable from a take-up roll 10 upon loading or unloading a cassette 8 by connecting means which is movable directly in response to the loading or unloading.

With reference to FIG. 1, the main body of the apparatus has a case 1 including a bottom plate 2, on which a cassette loading portion 3 is provided. The loading portion 3 has a base plate 4 for receiving thereon the cassette 8 containing an ink material 7. The cassette 8 is removably supported by pads 5, for example, of Moltopren and rear blocks 6 for positioning the cassette rear portion.

Figure 2:
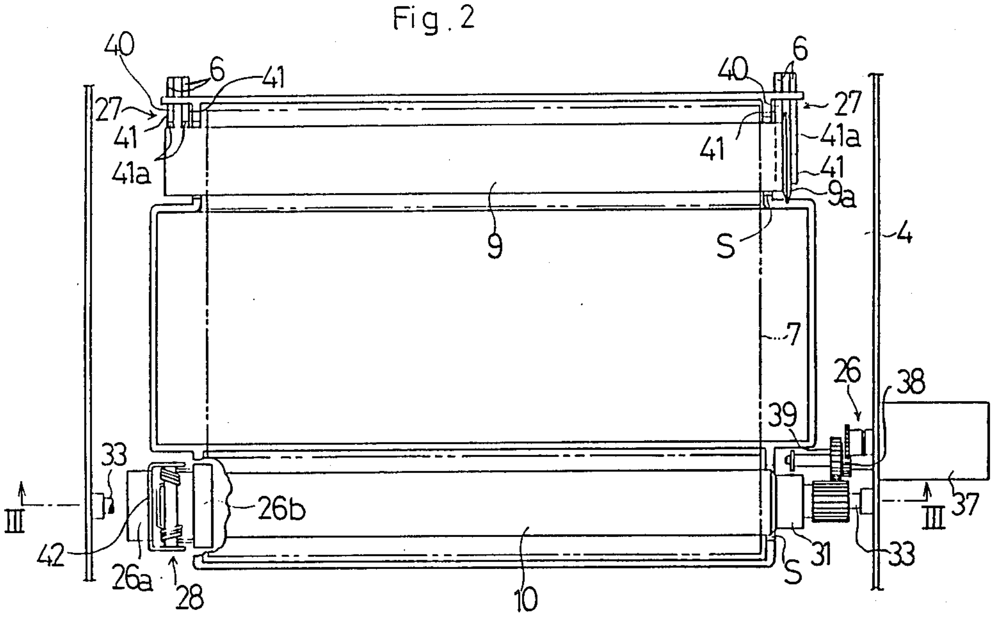
FIG. 2 is a view in section taken along the line II—II in FIG. 1.
Figure 4:
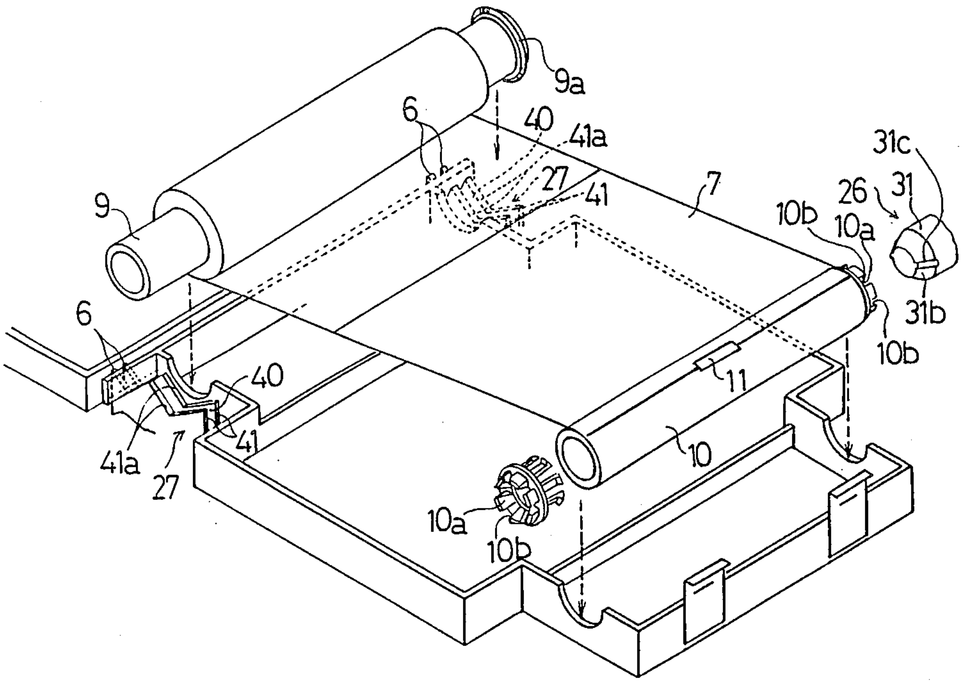
FIG. 4 is a perspective view showing a cassette as disassembled, along with part of the apparatus in which it is loaded as seen in FIGS. 1 to 3.

The cassette 8, which is made of a synthetic resin, holds a feed roll 9 in its front side and the take-up roll 10 in its rear side with some plays S as seen in FIGS. 1 and 2. The material 7 is wound around the feed roll 9 and has its leading end affixed to the take-up roll 10 with an adhesive tape 11 as seen in FIG. 4. The material 7 is used between the two rolls 9 and 10 for heat transfer. Windows 13 and 12 are respectively formed in the top plate and bottom plate of the cassette 8. For the heat transfer operation, an assembly of thermal head 14 is provided which extends from the bottom plate side upward through the window 13 of the cassette 8 as supported on the pads 5 and the blocks 6 on the base plate 4 of the loading portion 3.

Between the two rolls 9, 10 of the loaded cassette 8, the thermal head 14 pushes up the material 7 above the cassette top plate to come into pressing contact with a platen 16 of a paper feeder 15 disposed in the upper interior portion of the main body case 1 as shown in FIG. 1. At the contact portion, the ink on the material 7 is thermally transferred to paper 17 by the thermal head 14 in a form of image.

About a rear hinge 18, the paper feeder 15 is pivotally movable from an operative position in FIG. 1 upward through an upper cavity 19 in the case 1 to a retracted position away from the cassette loading portion 3. The paper feeder 15 has a caterpillar feeder 20 which is positioned above the platen 16 and which is driven in timed relation with the platen 16 for feeding the paper 17 to the platen 16 and delivering the paper 17 from the platen 16 as indicated by arrows in FIG. 1. Indicated at 21 is a drive motor for the paper feeder 15, and at 22 a position sensor. The paper feeder 15 is provided with a paper guide plate 23 at its upper portion. The paper guide plate 23 has a bent front end **23*a* removably in engagement with a rod 24 on the feeder 15 and a rear end portion 23*b* merely resting on the top plate rear portion of the cover 1. Thus, the paper guide plate 23 is pivotally movable about the rod 24 to follow the above-mentioned shift of the paper feeder 15** and is also removable from the feeder.

At the front side of the paper feeder 15, there is provided with a removable front cover 25. When the paper feeder 15 is moved to its retracted position with the front cover 25 removed, the entire cassette loading portion 3 is open and accessible through the cavity 19 to render the cassette 8 readily loadable and unloadable.

As shown in FIG. 2, mounted on the base plate 4 within the main body case 1 are take-up means 26 opposed to the opposite ends of the take-up roll 10 sidewise when the cassette 8 is loaded, positioning blocks 27 opposed to the opposite ends of the feed roll 9 from below, and connecting means 28 movable in response to the loading or unloading of the cassette 8 for connecting the take-up means 26 to the take-up roll 10 or disconnecting the means 26 from the roll 10.

Figure 3:
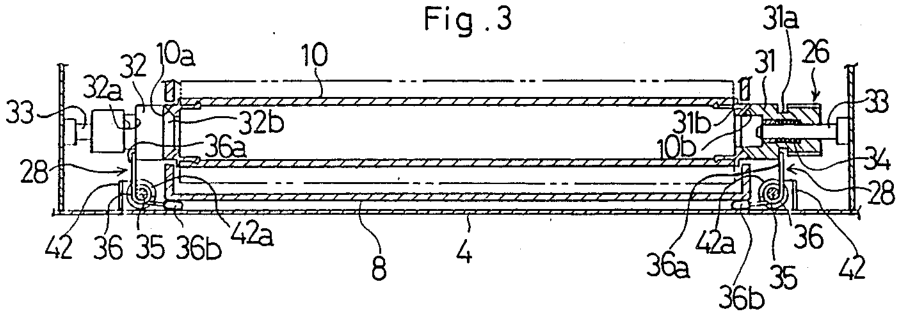
FIG. 3 is a view in section taken along the line III—III in FIG. 2.
Figure 5:
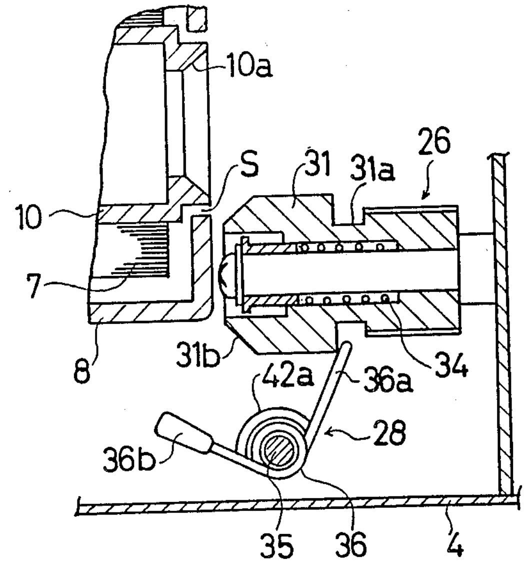
FIG. 5 shows a drive head serving as take-up means, as disconnected from a take-up roll upon unloading of the cassette.
Figure 6:
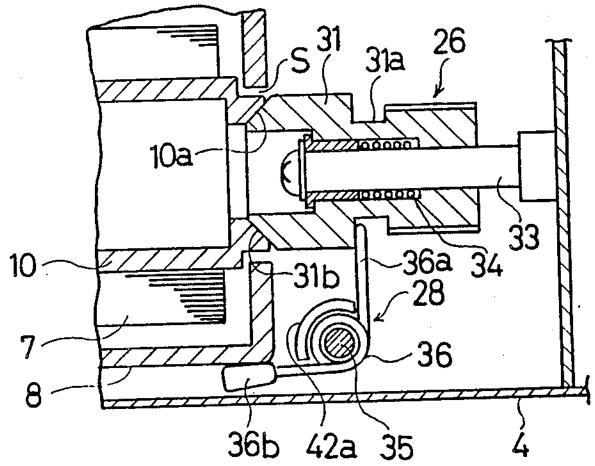
FIG. 6 shows the drive head as connected to the take-up roll upon loading of the cassette.

The take-up means 26 comprises positioning-driving heads 31 and 32 each opposed to the corresponding end of the take-up roll 10 of the loaded cassette 8 and positioned substantially in alignment with the roll 10. With reference to FIGS. 3, 5 and 6, each of the heads 31, 32 is rotatably and axially movably supported on a shaft 33 projecting from a side wall of the base plate 4 and is always biased by a spring 34 acting between the head and the shaft 33 so as to be retained in its retracted position shown in FIG. 5. When in the retracted position, the heads 31, 32 are free of interference with the cassette 8 to be loaded or unloaded.

The connecting means 28 comprises spring levers 36, 36 L-shaped as shown in FIG. 5 and each supported by a pivot 35 on the base plate 4 below the head. Each spring lever 36 has one end **36*a* engaged in an annular groove 31*a* (32*a*) in the outer periphery of the head 31 (32) so as to be movable with the axial movement of the head 31 (32). The other end 36*b* of the spring lever 36 is so positioned as to bear against the bottom of the cassette 8** to be loaded.

Usually, the spring lever 36 has its other end **36*b* raised above the base plate 4 by following the movement of the head 31 (32) to return to its retracted position under the action of the spring 34. When loaded in place for use as seen in FIGS. 1 and 3, the cassette 8 depresses the other end 36*b*, causing the above-mentioned one end 36*a* to advance the head 31 (32), whereby a male tapered face 31*b* (32*b*) of the head 31 (32) is resiliently brought into pressing contact with a female tapered face 10*a* at the end of the take-up roll 10 of the loaded cassette 8, utilizing the spring action of the spring lever 36 itself. Thus, the heads 31, 32 are pressed into contact with the roll 10** from opposite sides axially thereof.

In this way, the take-up roll 10 is held between the heads on the base plate 4 from opposite sides through the pressing contact independently of the cassette 8. The roll 10 can therefore be aligned with the heads and positioned in place axially thereof as required, automatically in operative relation with the loading of the cassette 8. The torque of a motor 37 delivered to the head 31 can then be transmitted to the roll 10.

The spring 34 and the spring lever 36 acting on each head 31(32) are adapted to exert a sufficient force to withstand the gravity acting on the cassette 8. Accordingly, when merely fitted into the loading portion 3, the cassette 8 is held raised at the take-up roller side thereof by the spring levers 36 without being loaded in position for use.

The cassette 8 is placed in position for use by moving the paper feeder 15 to its operative position shown in FIG. 1 and thereby depressing the cassette 8 with contact between a projection **15*a* of the paper feeder 15 and a side wall 8*a* of the cassette 8, whereby the take-up roll 10 is connected to the take-up means 26 and positioned accurately automatically. The cassette 8 is held in position for use by locking the paper feeder 15** in its operative position.

Accordingly, when the paper feeder 15 is moved toward its retracted position, the cassette 8 is released from the depression, with the result that the springs 34 return the heads 31, 32 to their retracted position, freeing the take-up roll 10 from the pressing heads and making the cassette 8 unloadable. At the same time, the cassette 8 is raised at the take-up roller side thereof by the spring levers 36 and thereby made easily unloadable.

To assure drive force transmission from the head 31 to the take-up roll 10, the male tapered face **31*b* and the female tapered face 10*a* to be brought into pressing contact therewith are respectively formed with projections 31*c* and indentations 10*b* engageable with each other. Even if these portions are not in proper engagement when the cassette 8 is loaded to effect automatic contact, the head 31 will slidingly rotate relative to the take-up roll 10** to result in proper engagement when initiated into rotation by the drive force, hence no problem.

The drive force is transmitted from the motor 37 to the head 31 via a friction clutch 38 and a gear train 39 as shown in FIG. 2. This eliminates the likelihood that a great force, if delivered, would cause damage to the heat transfer material 7.

A plate member 42 for supporting the spring lever 36 has a projection **42*a* for limiting the angle between its opposite ends 36*a*, 36*b* at least to a specified angle. The projection 42*a* is movable with the lever 36** so as not to interfere with the lever when it is moved.

At each side of the loading portion 3, the positioning block 27 is integral with some of the aforementioned blocks 6 for supporting the cassette 8 on the base plate 4 and comprises a pair of upright walls 41, 41 spaced apart by a clearance 40 and providing a V-shaped bearing portion **41*a* for rotatably supporting the end of the feed roll 9 of the loaded cassette 8. Thus, the feed roll 9 is supported at its opposite ends by the bearing portions 41*a* and is thereby accurately centered on the base plate 4 in parallel with the take-up roll 10**.

The feed roll 9 has a positioning flange **9*a* integral with one end thereof. When the cassette 8 is loaded, the flange 9a fits into the clearance 40 between the upright walls 41, whereby the feed roll 9 on the base plate 4 is restrained axially thereof. With respect to the axial direction, therefore, the feed roll 9 is accurately positioned relative to the take-up roll 10 which is axially restrained by the heads 31, 32, in contact with the roll ends, of the take-up means 26 on the base plate 4**.

Consequently, when the take-up roll 10 is drivingly rotated, the material 7 is paid off from the feed roll 9, travels toward the take-up roll 10 without zigzagging or creasing, is used in a specified position for heat transfer free of creasing and is wound at a predetermined position around the take-up roll 10.

To make the positioning flange 9a readily fittable into the clearance 40, the flange has a radially outwardly tapered peripheral edge.

The present invention is not limited to the foregoing embodiment but can be modified variously insofar as the advantage of the invention can be insured. For example, the bearing portion 41a for centering the feed roll 9 need not always be V-shaped, while the roll 9 can be restrained axially thereof by being held at its opposite ends between other members. Similarly, the take-up means 26, as well as the connecting means 28, can be designed into various modifications.

FIGS. 7 to 11 show a second embodiment of the invention which has the same construction as the first embodiment except that the take-up means is automatically connected to or disconnected from the take-up roll upon loading or unloading the cassette, by connecting means which is movable in response to the movement of holding means for holding the cassette in position for use or releasing the cassette from this position.

Figure 7:
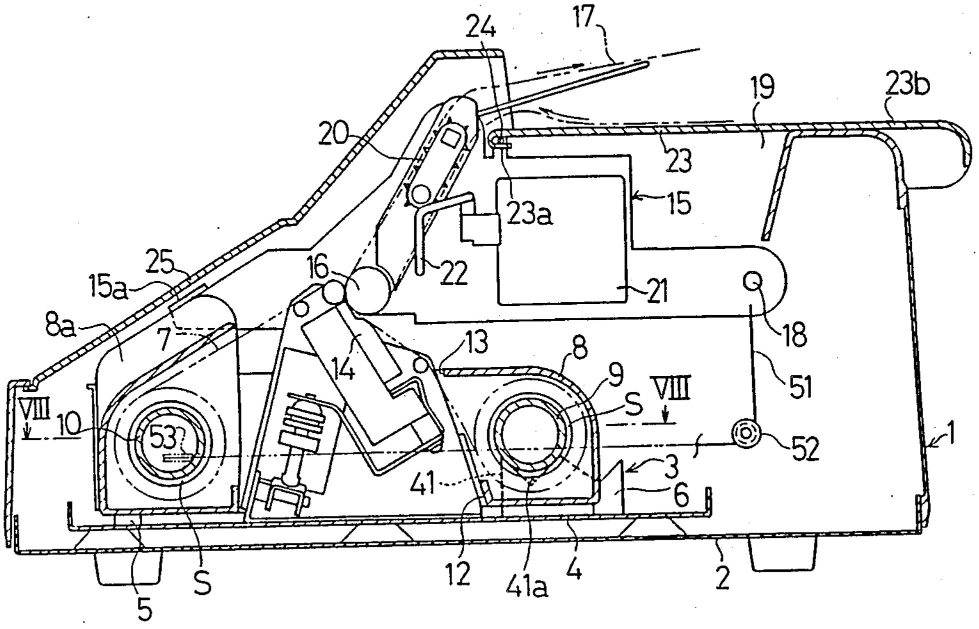
FIG. 7 is an overall sectional view showing a heat transfer recording apparatus as a second embodiment of the invention.
Figure 8:
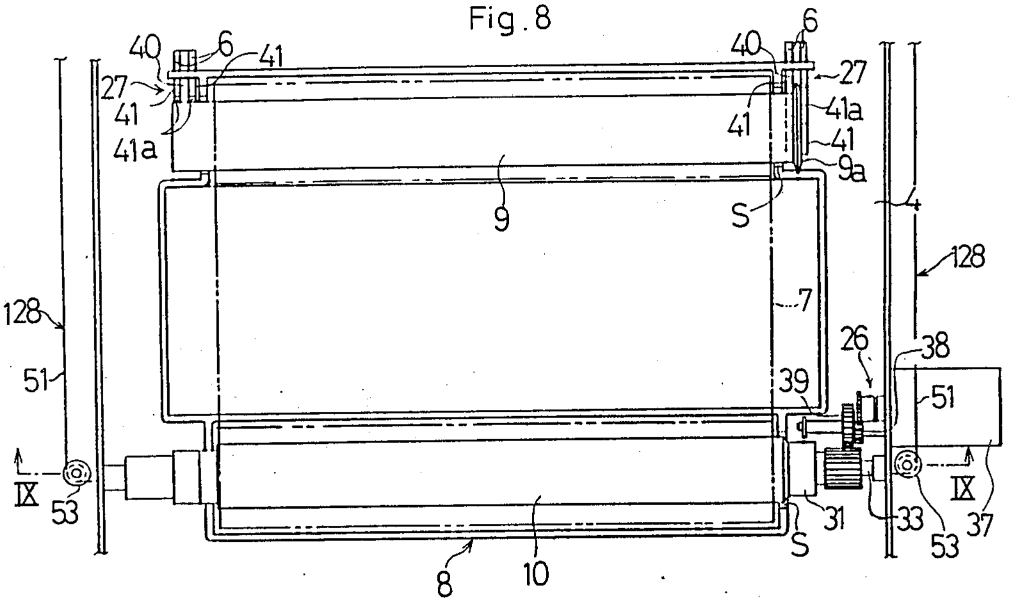
FIG. 8 is a view in section taken along the line VIII—VIII in FIG. 7.
Figure 9:
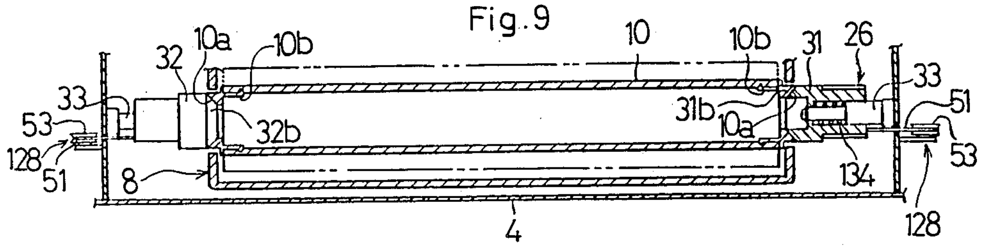
FIG. 9 is a view in section taken along the line IX—IX in FIG. 7.
Figure 10:
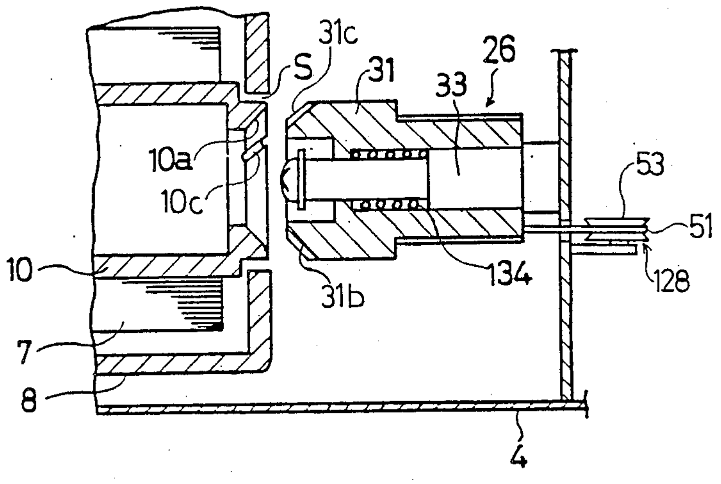
FIG. 10 shows a drive head serving as take-up means, as disconnected from a take-up roll upon unloading of the cassette.
Figure 11:
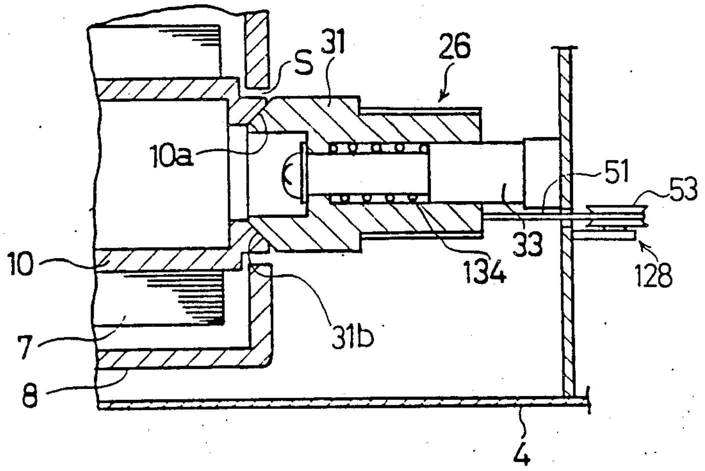
FIG. 11 shows the drive head as connected to the take-up roll upon loading of the cassette.

The holding means is the paper feeder 15 shown in FIG. 7. The connecting means, indicated at 128, comprises a wire 51 connecting the paper feeder 15 to each of the positioning-driving heads 31, 32 of the take-up means 26. The heads 31, 32 are biased toward their connected position each by a spring 134. The wire 51 is reeved around and guided by intermediate pulleys 52, 53 and moves in response to the movement of the paper feeder 15 when it is brought to its retracted position, retracting the head 31 (32) out of connection with the take-up roll 10 against the spring 134 as seen in FIG. 10.

Conversely, when the paper feeder 15 is brought to its operative position, the head 31 (32) is relieved of the tension on the wire 51 and is therefore returned by the action of the spring 134 to the position where it it is connected to the take-up roll 10. At this time, the male tapered face **31*b* (32*b*) of the head 31 (32) is resiliently brought into pressing contact with the female tapered end face 10*a* of the take-up roll 10 of the loaded cassette 8 by the spring 134**.

Thus, the heads 31, 32 on the base plate 4 are pressed into contact with the take-up roll 10 from opposite sides axially thereof to hold the roll 10 independently of the cassette 8 as in the first embodiment, whereby the roll 10 is aligned with the heads and positioned in place axially thereof as required, automatically in operative relation with the loading of the cassette 8. The drive force of the motor 37 delivered to the head 31 can then be transmitted to the roller 10. The cassette 8 is held in position for use by locking the paper feeder 15 in its operative position.

Briefly, the paper feeder 15, when merely brought to its retracted position, renders the cassette 8 loadable or unloadable without necessitating any special procedure. The take-up roll 10 in the loaded cassette 8 can be made ready for rotation to wind up the ink material merely by bringing the paper feeder 15 to its operative position without necessitating any special procedure.

What is claimed is:

1. A heat transfer recording apparatus for use with a cassette accommodating an ink material between a feed roll and a take-up roll, wherein the ink material and a recording sheet overlapped thereto are passed between a platen and a thermal head pressed thereagainst for thermally transferring an ink image to the recording sheet, the apparatus comprising:
   - a cassette loading portion for removably loading the cassette therein, the loading portion having holding means for bringing the platen into and out of contact with the thermal head to render the cassette removably loadable and for holding the cassette in position for use when holding the platen in pressing contact with the thermal head,
   - take-up means for driving the take-up roll, the take-up means being mounted on the loading portion and connectable to and disconnectable from the take-up roll when the cassette is in position for use, wherein the take-up means is biased toward the disconnectable position,
   - connecting means having a pushing member movable directly in response to the movement of the cassette in the loading portion toward the position for use, whereby the take-up means is shifted to the connected position against the biasing action by the responsive movement of the pushing member.

2. An apparatus as defined in claim 1 wherein the pushing member comprises a spring lever pivotably supported at its central portion and having one end in engagement with the take-up means and the other end positioned under the bottom of the cassette when the cassette is in the loading portion.

3. An apparatus as defined in claim 1 wherein the take-up means comprises a pair of driving heads positioned at opposite sides of the take-up roll when the cassette is loaded in the loading portion, and the driving heads, when in connected position, fit each at a tapered portion to the opposite ends of the take-up roll and resiliently hold the take-up roll therebetween to center the take-up roll and axially position the same in place.

4. An apparatus as defined in claim 1 further comprising a bearing means for removable supporting thereon the feed roll as centered and positioned in place axially thereof, the bearing means having a V-shaped portion for receiving the periphery of each end of the feed roll to center the feed roll, the bearing means having a groove perpendicular to the axis of the feed roll for receiving therein a positioning flange on the periphery of the feed roll end to position the feed roll in place axially thereof.

5. A heat transfer recording apparatus for use with a cassette accommodating an ink material between a feed roll and a take-up roll, wherein the ink material and a recording sheet overlapped thereto are passed between a platen and a thermal head pressed thereagainst for thermally transferring an ink image to the recording sheet, the apparatus comprising:
   - a cassette loading portion for removably loading the cassette therein, the loading portion having holding means for bringing the platen and out of contact with the thermal head to render the cassette removably loadable and for holding the cassette in position for use when holding the platen in pressing contact with the thermal head, take-up means for driving the take-up roll, the take-up means being mounted on the loading portion and connectable to and disconnectable from the take-up roll when the cassette is in position for use, wherein the take-up means is biased toward the connected position, connecting means which connects the movement of the holding means and the take-up means in responsive movement, whereby the take-up means is shifted to the disconnected position by the connecting means against the biasing action in response to the movement of the holding means to move the platen away from the thermal head and release the cassette from its position for use.

6. An apparatus as defined in claim 5 wherein the holding means comprises the platen and a sheet feeder having a sheet transport assembly for feeding the recording sheet to the platen and delivering the sheet therefrom, the sheet feeder being movable about a hinge pin to bring the platen into and out of contact with the thermal head and to open or close the loading portion.

7. An apparatus as defined in claim 6 wherein the connecting means comprises a wire connecting the take-up means to the sheet feeder.

8. An apparatus as defined in claim 5 wherein the take-up means comprises a pair of driving heads positioned at opposite sides of the take-up roll when the cassette is loaded in the loading portion, and the driving heads, when in the connected position, fit each at a tapered portion to the opposite ends of the take-up roll and resiliently hold the take-up roll therebetween to center the take-up roll and axially position the same in place.

9. An apparatus as defined in claim 5 wherein comprising a bearing means for removably supporting thereon the feed roll as centered and position in place axially thereof, the bearing means having a V-shaped portion for receiving the periphery of each end of the feed roll to center the feed roll, the bearing means having a groove perpendicular to the axis of the feed roll for receiving therein a positioning flange on the periphery of the feed roll end to position the feed roll in place axially thereof.

* * * * *